United States Patent
Nakamura

(10) Patent No.: US 8,141,933 B2
(45) Date of Patent: Mar. 27, 2012

(54) VEHICLE DOOR AND METHOD OF MANUFACTURING SAME

(75) Inventor: Mitsuyoshi Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 246 days.

(21) Appl. No.: 12/448,099

(22) PCT Filed: Nov. 12, 2007

(86) PCT No.: PCT/JP2007/071888

§ 371 (c)(1),
(2), (4) Date: Jun. 8, 2009

(87) PCT Pub. No.: WO2008/072440

PCT Pub. Date: Jun. 19, 2008

(65) Prior Publication Data

US 2009/0302635 A1    Dec. 10, 2009

(30) Foreign Application Priority Data

Dec. 11, 2006 (JP) .................................. 2006-332943
Mar. 5, 2007 (JP) .................................. 2007-054026

(51) Int. Cl.
*B60J 5/00* (2006.01)

(52) U.S. Cl. .................. 296/146.7; 296/152; 296/146.9; 296/37.13

(58) Field of Classification Search ............... 296/146.9, 296/37.13, 39.1, 146.5, 146.7, 149, 152, 296/146; 49/503, 502; 29/428
See application file for complete search history.

(56) References Cited

U.S. PATENT DOCUMENTS

| | | | | |
|---|---|---|---|---|
| 1,694,855 A * | 12/1928 | Irons | ............................ | 296/37.13 |
| 3,081,126 A * | 3/1963 | Theberge | ........................ | 296/37.1 |
| 4,619,477 A * | 10/1986 | Kneib et al. | ................. | 296/37.13 |
| 5,072,983 A * | 12/1991 | Muroi et al. | ................. | 296/37.13 |
| 5,702,144 A * | 12/1997 | Matsuura et al. | ............ | 296/37.13 |
| 5,800,004 A * | 9/1998 | Ackeret | ........................ | 296/37.13 |
| 5,934,532 A * | 8/1999 | Rausch et al. | ................ | 224/544 |
| 6,019,418 A * | 2/2000 | Emerling et al. | ........... | 296/146.8 |
| 6,116,672 A * | 9/2000 | Cannon et al. | .............. | 296/37.13 |
| 6,381,906 B1 * | 5/2002 | Pacella et al. | .................. | 49/502 |
| 6,971,698 B1 * | 12/2005 | King | ........................... | 296/37.13 |
| 7,244,383 B2 * | 7/2007 | Youngs et al. | ................. | 264/255 |
| 7,328,825 B2 * | 2/2008 | Kaiser | ............................ | 224/543 |

(Continued)

FOREIGN PATENT DOCUMENTS

GB    2 155 422 A    9/1985

(Continued)

*Primary Examiner* — Glenn Dayoan
*Assistant Examiner* — Pinel Romain
(74) *Attorney, Agent, or Firm* — Carrier Blackman & Associates, P.C.; Joseph P. Carrier; William D. Blackman

(57) ABSTRACT

A vehicle door, such as a tailgate (1), having a pull pocket (P) on which a hand is put when the door is manipulated includes a door panel (2), a lining (3), and a pull pocket member (4). The lining (3) is provided over an inside of the door panel (2) facing toward a vehicle cabin when the door is mounted to a vehicle body. The pull pocket member (4) is a member formed independently of the lining (3) and mounted to the lining (3). The pull pocket member (4) includes a recessed portion (41) which is recessed toward the door panel (2) and configured to form an undercut at a face (3*a*) of the lining (3) facing toward the vehicle cabin when the pull pocket member (4) is mounted to the lining (3).

4 Claims, 8 Drawing Sheets

U.S. PATENT DOCUMENTS

| | | | |
|---|---|---|---|
| 7,594,686 B2 * | 9/2009 | Augustyn | 296/37.13 |
| 2002/0149222 A1 * | 10/2002 | Heranney | 296/37.13 |

FOREIGN PATENT DOCUMENTS

| | | | |
|---|---|---|---|
| JP | 60-160010 U | | 10/1985 |
| JP | 3-110372 A | | 5/1991 |
| JP | 9-142227 A | | 6/1997 |
| JP | 9-193665 A | | 7/1997 |
| JP | 2002-081232 A | | 3/2002 |
| JP | 2006-327536 | * | 12/2006 |
| JP | 2006-327536 A | | 12/2006 |

* cited by examiner

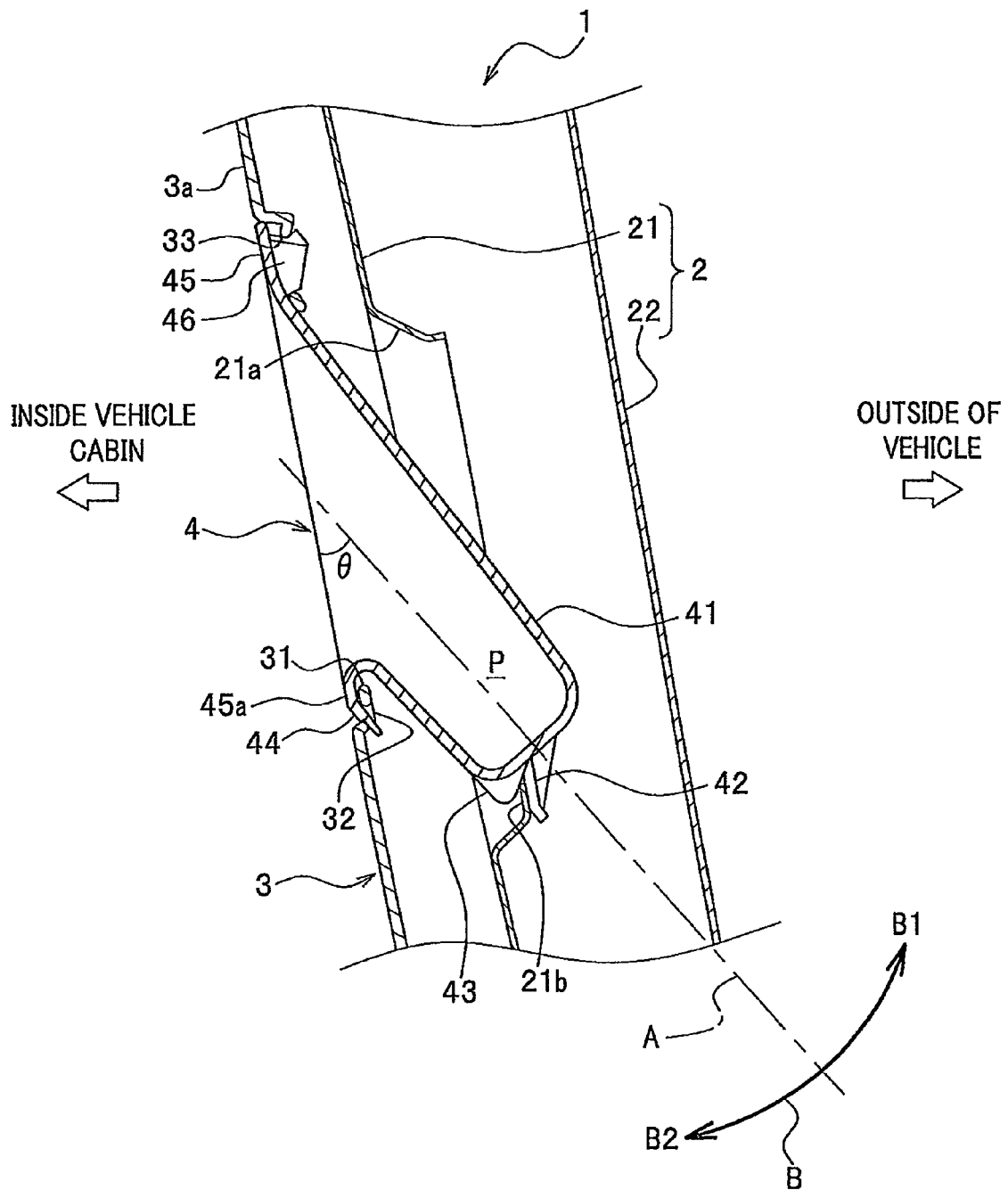

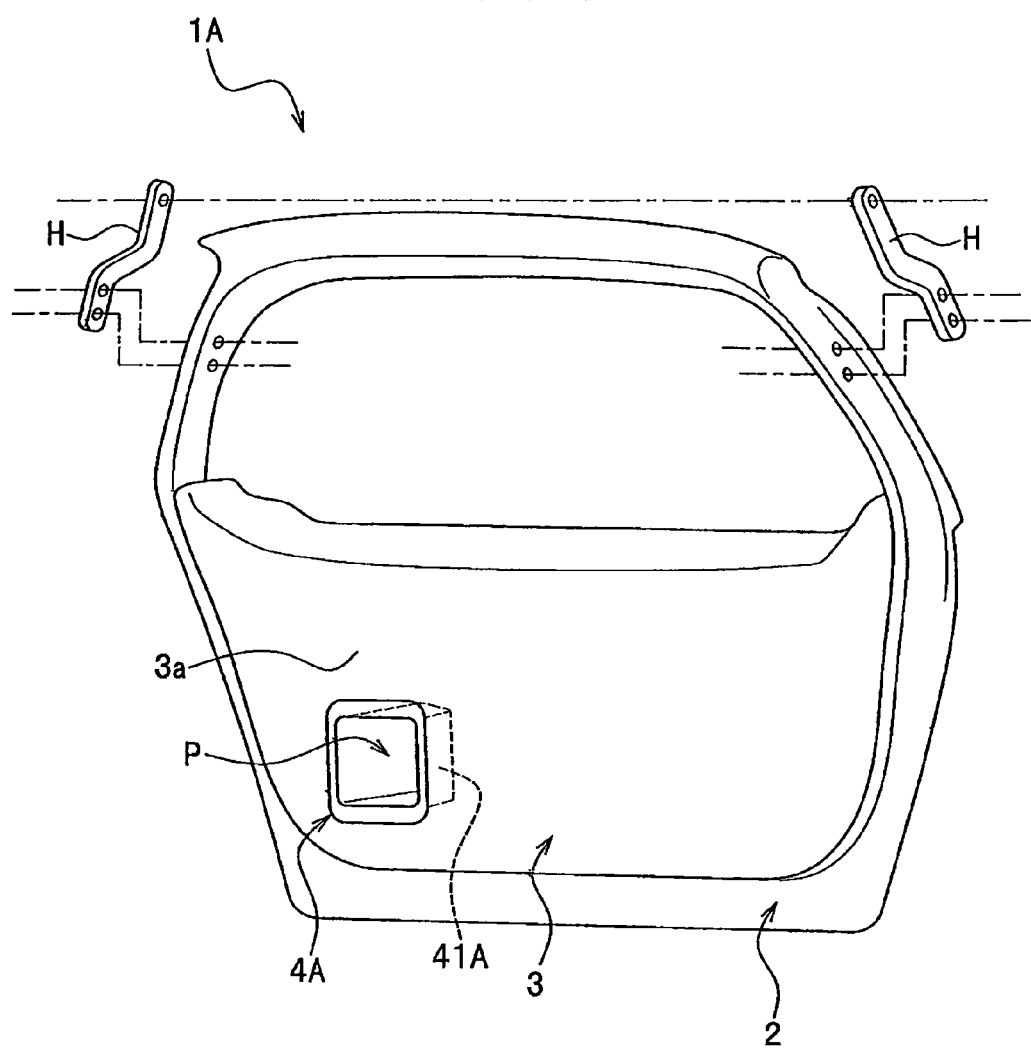

VEHICLE DOOR AND METHOD OF MANUFACTURING SAME

TECHNICAL FIELD

This invention relates to a vehicle door having a pull pocket and a method of manufacturing the same.

BACKGROUND ART

In general, a vehicle door is provided with a pull pocket on which a hand is put when the door is manipulated.

In JP 9-193665 A (Paragraph 0006, FIG. 3), for example, is disclosed a rear door of a vehicle, in which the door has a lining (rear door trim) making up an interior trim of the door, and a pull pocket (a recessed portion of the lining) formed integrally with the lining and recessed upwardly from its opening located near a lower edge of the lining.

However, the pull pocket in a vehicle door constructed in a conventional manner as above is formed integrally with the lining, and thus suffers from limitations on the directions in which a mold is separated or a casting is drawn from a mold, which would disadvantageously reduce the moldable design variation of the pull pocket.

It would be desirable to provide a vehicle door and a method of manufacturing the same, in which the door can be manipulated easily with a hand put thereon and the moldable design variation of the pull pocket can be increased. The present invention has been made in an attempt to overcome the aforementioned disadvantages.

DISCLOSURE OF INVENTION

In one aspect of the present invention, there is provided a vehicle door having a pull pocket on which a hand is put when the door is manipulated. The vehicle door comprises a door panel, a lining provided over an inside of the door panel facing toward a vehicle cabin when the door is mounted to a vehicle body, and a pull pocket member formed independently of the lining and mounted to the lining. The pull pocket member comprises a recessed portion which is recessed toward the door panel and configured to form an undercut at a face of the lining facing toward the vehicle cabin when the pull pocket member is mounted to the lining.

With this construction, since the pull pocket member is formed independently of the lining, there is no need to consider that the recessed portion should form an undercut at the face (facing toward the vehicle cabin) of the lining to which the pull pocket member is mounted, when the recessed portion is formed in the pull pocket member. Therefore, the moldable design variation of the pull pocket can be increased. Moreover, since the pull pocket member is formed independently of the lining, the pull pocket member would never interfere with the formation of the lining. Accordingly, the formation of the lining is facilitated, and the manufacture of the door is facilitated, as well. Furthermore, since the recessed portion of the pull pocket member is configured to form an undercut at the face of the lining facing toward the vehicle cabin when the pull pocket member is mounted to the lining, the door can be provided with a pull pocket on which a hand can be put easily when the door is manipulated. Hereupon, the "undercut" refers to an underside recess molded so as to leave an overhanging portion which prevents the final casting from being released from the mold as it stands.

The recessed portion may, preferably but not necessarily, be recessed in a direction substantially perpendicular to a direction of a swinging motion of the door. If the recessed portion is recessed in a direction substantially perpendicular to a direction of a swinging motion of the door, the manipulation force can be applied easily in the direction of the swinging motion of the door. Therefore, a transmission efficiency of the manipulation force is increased so that manipulation force required to open or close the door can be reduced.

The pull pocket member may, preferably but not necessarily, further comprise an engaging portion engageable with the door panel from a direction of a swinging motion of the door. With this configuration, in which the engaging portion provided in the pull pocket member engages with the door panel when the pull pocket member is mounted to the lining, the rigidity at a mounted position of the pull pocket member may be enhanced. Since the engaging portion in this embodiment is configured to engage with the door panel from the direction of the swinging motion of the door, the manipulation force to be applied when the door is opened or closed is directly and thus efficiently transmitted to the door panel.

The pull pocket member may, preferably but not necessarily, further comprise a retaining portion allowing the door panel to be pinched between the retaining portion and the engaging portion. With this configuration, in which the door panel is pinched between the retaining portion and the engaging portion when the pull pocket member is mounted to the lining, a backlash or rattle of the pull pocket member can be prevented.

The vehicle door according to any one of the above embodiments may, preferably but not necessarily, further comprise a spacer member configured to extend between the recessed member and the lining and disposed at a back of the lining in a position opposed to a sidewall of the recessed portion which makes up an underside of an overhanging portion of the undercut formed at the face of the lining facing toward the vehicle cabin when the pull pocket member is mounted to the lining. With this additional feature, when a manipulation load is applied to the pull pocket member, the manipulation load is firmly supported and borne by the spacer member, and the recessed portion can thus be prevented from becoming dislocated or deformed, so that an impairment of its crafted appearance from the inside of the vehicle cabin can be avoided. Moreover, the strength at a mounted position of the pull pocket member may be enhanced, and thus the feel of firmness and robustness given when the door is manipulated can be improved. Furthermore, in cases where an engaging portion engageable with the door panel is provided in the pull pocket member, the engaging portion can engage with the door panel without fail, because the spacer member serves to position the pull pocket member to an appropriate place.

The spacer member may, preferably but not necessarily, comprise a contact portion contoured to fit the sidewall of the recessed portion and configured to rest upon the sidewall of the recessed portion when the pull pocket member is mounted to the lining. With this additional feature, the recessed portion may come in contact with the contact portion of the spacer member without a gap left therebetween, and thus the recessed portion is retained thereon in a stable manner, so that a manipulation load applied to the pull pocket member may be firmly supported and borne by the spacer member.

In the above embodiments, preferably but not necessarily, the lining may have a mounting hole in which the recessed portion is fitted when the pull pocket member is mounted to the lining, and the spacer member may be mounted on the back of the lining at a peripheral edge of the mounting hole. With these additional features, the rigidity at a mounted position, especially at the peripheral edge of the mounting hole, of the pull pocket member may be enhanced. Accordingly, deformation of the recessed portion and the lining may be suppressed, and the feel of firmness and robustness given when the door is manipulated can be improved more effectively.

In the above embodiments, preferably but not necessarily, the lining may have a mounting hole in which the recessed portion is fitted when the pull pocket member is mounted to the lining, and the pull pocket member may further comprise a hook portion for use in hooking the pull pocket member over a peripheral edge of the mounting hole, the hook portion being disposed near an opening of the recessed portion at a sidewall of the recessed portion which makes up an underside of an overhanging portion of the undercut formed at the face of the lining facing toward the vehicle cabin when the pull pocket member is mounted to the lining. With this configuration, the hook portion for use in hooking the pull pocket member over the peripheral edge of the mounting hole is provided near the opening of the recessed portion at the sidewall making up the undercut, and the pull pocket member may thus be swung on the hook portion when the pull pocket member is mounted. Accordingly, the pull pocket member can be mounted to the lining with increased ease.

In the above embodiments, preferably but not necessarily, the lining may have a mounting hole in which the recessed portion is fitted when the pull pocket member is mounted to the lining, the pull pocket member may further comprise a pair of hook portions for use in hooking the pull pocket member over a peripheral edge of the mounting hole, the hook portions being disposed separately near an opening of the recessed portion at the sidewall of the recessed portion which makes up the underside of the overhanging portion of the undercut formed at the face of the lining facing toward the vehicle cabin when the pull pocket member is mounted to the lining, and the lining may have a pair of engaging holes, in which the pair of hook portions are engageable respectively, the engaging holes being disposed near the peripheral edge of the mounting hole, wherein the spacer member is disposed at a midpoint position between the engaging holes of the lining. With this configuration, in which the spacer member is disposed at the sidewall of the pull pocket member making up the undercut of the lining, at a midpoint position between the engaging holes of the lining, i.e., at a midpoint position between the hook portions, so as to extend between these midpoint positions, the strength at a mounted position of the pull pocket member may be enhanced in an effective manner.

In another aspect of the present invention, there is provided a method of manufacturing a vehicle door. In this method of manufacturing a vehicle door, the aforementioned hook portion is hooked over the peripheral edge of the mounting hole; thereafter, the pull pocket member is swung on the hook portion until the recessed portion of the pull pocket member engages with the door panel.

Under this method, the pull pocket member can be mounted to the lining and the door panel in a simple operation which essentially consists of hooking of the hook portion over a peripheral edge of the mounting hole and subsequent swinging of the pull pocket member on the hook portion.

To be more specific, a method of manufacturing a vehicle door according to one embodiment of the present invention is a method of manufacturing a vehicle door having a pull pocket on which a hand is put when the door is manipulated. The method comprises: providing a door panel with a lining over an inside of the door panel which faces toward a vehicle cabin when the door is mounted to a vehicle body, the lining having a mounting hole; providing a pull pocket member comprising a recessed portion and a hook portion, the recessed portion being configured to form an undercut at a face of the lining which faces toward the vehicle cabin when the recessed portion of the pull pocket member is fitted in the mounting hole of the lining to mount the pull pocket member to the lining, the hook portion being disposed near an opening of the recessed portion at a sidewall of the recessed portion which makes up an underside of an overhanging portion of the undercut formed at the face of the lining facing toward the vehicle cabin when the pull pocket member is mounted to the lining; fitting the recessed portion of the pull pocket member into the mounting hole of the lining until the hook portion of the pull pocket member is hooked over a peripheral edge of the mounting hole of the lining; and swinging the pull pocket member on the hook portion with the hook portion hooked over the peripheral edge of the mounting hole of the lining until the recessed portion of the pull pocket member engages with the door panel.

The above-described method may further comprise: pinching the door panel between an engaging portion and a retaining portion provided in the pull pocket member when the recessed portion engages with the door panel. Alternatively or additionally, the providing the door panel may comprise providing a spacer member at a back of the lining in a position opposed to the sidewall of the recessed portion which makes up the underside of the overhanging portion of the undercut formed at the face of the lining facing toward the vehicle cabin when the pull pocket member is mounted to the lining, such that the sidewall of the recessed portion is supported by the spacer member from a direction of a swinging motion of the door when the recessed portion engages with the body panel.

The above and other aspects, and further features and advantages of the present invention will become more apparent by describing in detail illustrative, non-limiting embodiments thereof with reference to the accompanying drawings.

BRIEF DESCRIPTION OF DRAWINGS

FIG. 2 is a sectional view taken along line I-I of FIG. 1;

FIG. 5 is a perspective view of a vehicle door according to a second embodiment;

MODE(S) FOR CARRYING OUT THE INVENTION

Figure 1:
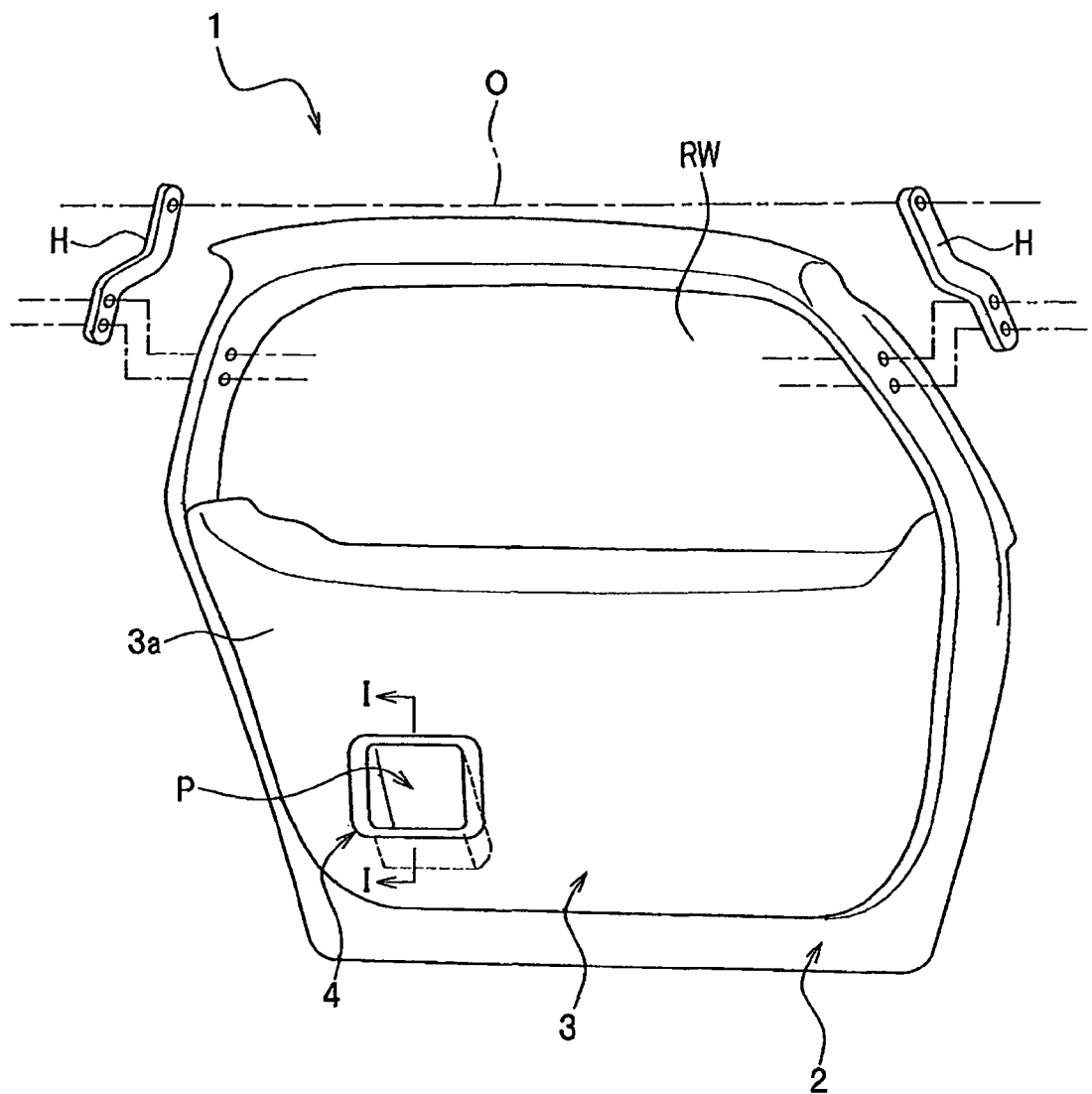
FIG. 1 is a perspective view of a vehicle door according to a first embodiment.

A first embodiment of the present invention will be described with reference to the drawings. In the description, the same elements will be designated by the same reference characters, and a duplicate description will be omitted. When reference is made to a particular direction in describing the present embodiment, it is indicated with reference to the front, rear, left, right, top, and bottom direction of an automobile as a vehicle to which a door is to be mounted.

As shown in FIG. 1, a tailgate 1, which is a door provided at the rear of the automobile (vehicle), is attached to an upper portion of the rear of the vehicle by a pair of hinge members H. The tailgate 1 is thus configured to vertically swing around a pivot axis O. At an inside of the tailgate 1 facing toward a vehicle cabin is provided a pull pocket P which is recessed and on which a hand is put when the door is manipulated.

The tailgate 1 principally includes a door panel 2, a lining 3 provided over an inside of the door panel 2 facing toward the vehicle cabin, and a pull pocket member 4 mounted to the lining 3. In addition, the tailgate 1 includes a rear window RW configured to provide a view of the area behind the vehicle.

As shown in FIG. 2, the door panel 2, which forms a framework of the tailgate 1, is comprised of two steel sheet members combined together. In the first embodiment, the door panel 2 is comprised of a door outer panel 22 to be exposed to an outside of the vehicle, and a door inner panel 21 welded and fixed to an inside of the door outer panel 22 facing toward the vehicle cabin. Between the door inner panel 21 and the door outer panel 22 is provided a space in which a reinforcing member or the like is disposed.

The door inner panel 21 has a through hole 21a provided in a position corresponding to a position in which the pull pocket member 4 is to be disposed so as to avoid interference with the pull pocket member 4. A lower peripheral edge 21b which defines a lower edge of the through hole 21a is configured such that an engaging portion 42 of the pull pocket member 4 that will be described later is engageable therewith.

The door outer panel 22 is an exterior trim covering and protecting the door inner panel 2 and the pull pocket member 4 from being exposed to the outside of the vehicle. An exterior surface of the door outer panel 22 is painted, coated or otherwise surface-treated.

The lining 3 is an interior trim and made of a resinoid sheet member manufactured by injection molding, for example. The lining 3 is fixed by plastic clips, screws or the like to an inside of the door inner panel 21 facing toward the vehicle cabin with a space left therebetween.

The lining 3 has a mounting hole 31 allowing the pull pocket member 4 to be fitted therein. In the first embodiment, the mounting hole 31 is provided in a position closer to the right side of the vehicle. Around a peripheral edge of the mounting hole 31 are provided engaging holes 32, 33, (see FIG. 2) for use in attaching the pull pocket member 4 to the lining 3.

Figure 3A:
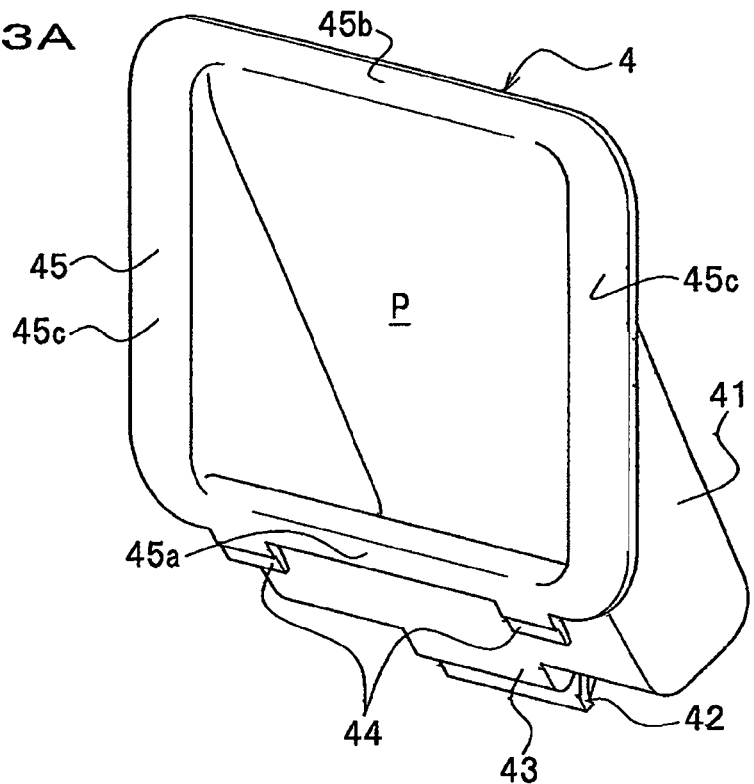
FIG. 3A is a perspective view of a pull pocket member as viewed from an inside of a vehicle cabin.
Figure 3B:
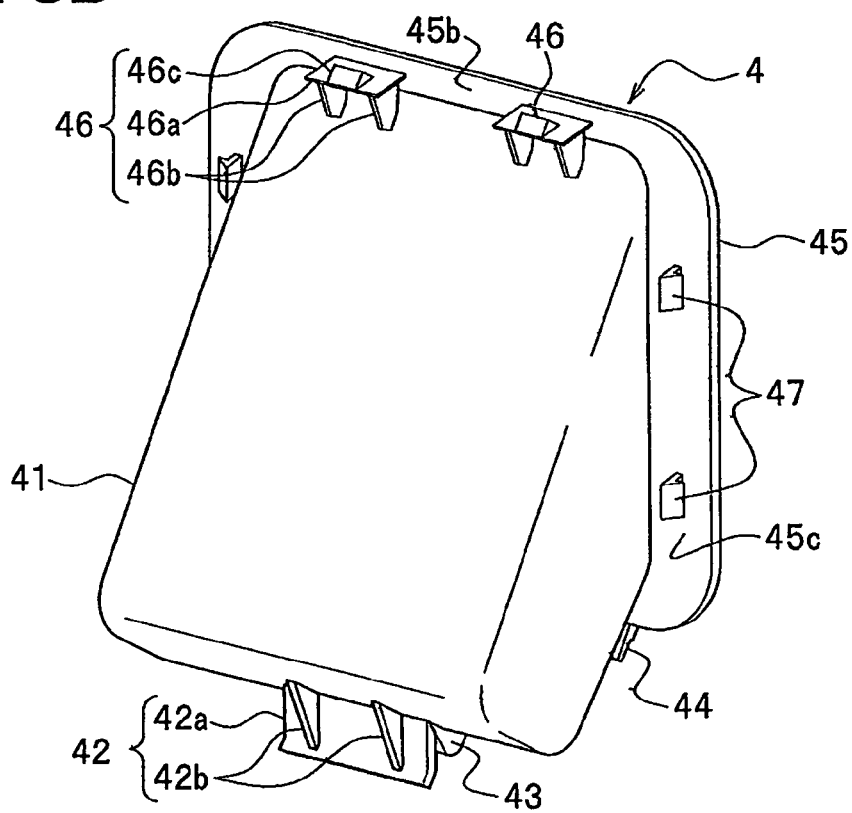
FIG. 3B is a perspective view of the pull pocket member as viewed from an outside of the vehicle cabin.

As shown in FIGS. 2, 3A and 3B, the pull pocket member 4 is a member which forms the pull pocket P in the lining 3, and is formed for example by injection molding of plastic material. The pull pocket member 4 is formed independently of the lining 3, and designed to be fitted in the mounting hole 31 of the lining 3.

The pull pocket member 4 principally includes a recessed portion 41, an engaging portion 42, a retaining portion 43, and a hook portion 44.

The recessed portion 41 is a portion which forms a pull pocket P and assumes a quadrangular tube having two ends of which one is open and the other is bottomed. The recessed portion 41 is recessed toward the door panel 2 when the pull pocket member 4 is mounted to the lining 3. A brim portion 45 is provided around the opening of the recessed portion 41. The brim portion 45 is formed to be flush with a face 3a of the lining 3 facing toward the vehicle cabin when the pull pocket member 4 is mounted to the lining 3.

The recessed portion 41 is configured such that an angle θ between a direction A in which the recessed portion 41 is recessed (see FIG. 2) and the brim portion 45 (i.e., angle θ formed between the direction A in which the recessed portion 41 is recessed and the face 3a of the lining 3 facing toward the vehicle cabin) is an acute angle. In this way, the recessed portion 41 forms an undercut at the face 3a of the lining 3 facing toward the vehicle cabin when the pull pocket member 4 is mounted to the lining 3. In the first embodiment, the recessed member 41 is recessed in an obliquely downward direction with respect to the face 3a of the lining 3 facing toward the vehicle cabin. In other words, the recessed portion 41 is shaped as if the face 3a of the lining 3 facing toward the vehicle cabin is scooped out in a downward direction. In this way, the recessed portion 41 forms a pull pocket P on which a hand may be put easily.

The recessed portion 41 is shaped such that the direction A in which the recessed portion 41 is recessed is substantially perpendicular to a direction B of a swinging motion of the door (see FIG. 2). As a result, the manipulation force applied in the direction B of the swinging motion of the door (especially, a closing direction B2) can be effected with increased ease, and a transmission efficiency of the manipulation force is thus increased so that manipulation force required to open or close the door can be reduced.

It is appreciated that a straight line passing through a point of application of the manipulation force and parallel to the direction A in which the recessed portion 41 is recessed (i.e., an extension of the sidewall of the recessed portion 41 which makes up an underside of an overhanging portion of the undercut formed at the face 3a of the lining 3) may preferably pass by (near), or more preferably intersect with, the pivot axis O of the tailgate 1 (see FIG. 1).

The engaging portion 42 is a portion which is engageable with the door panel 2, and provided protrusively at an outer surface of a bottom wall of the recessed portion 41. The engaging portion 42 includes an engageable piece 42a shaped like a rectangular plate, and a pair of ribs 42b provided to support and reinforce the engageable piece 42a. In the first embodiment, the engaging portion 42 is brought into contact from the closing direction B2 of the door with the lower peripheral edge 21b defining the through hole 21a of the door inner panel 21. In other words, the engaging portion 42 is configured to engage with the peripheral edge 21b inwardly from an outward direction of the vehicle toward the vehicle cabin, so that the engaging portion 42 can press the door inner panel 21 in the closing direction B2 of the door. Accordingly, the rigidity at a mounted position of the pull pocket member 4 may be enhanced, and the manipulation force to be applied when the door is opened or closed can directly and thus efficiently be transmitted to the door panel 2.

The retaining portion 43 is a portion used to pinch the door panel 2 in conjunction with the engaging portion 42, and provided protrusively at the outer surface of the bottom wall of the recessed portion 41, in a position closer to the vehicle cabin than the position in which the engaging portion 42 is provided. The retaining portion 43 is shaped, in side view, like a ridge of which a top is rounded. Thus, the retaining portion 43 is shaped to have a curved top such that the retaining portion 43 can easily pass over the lower peripheral edge 21b defining the through hole 21a of the door inner panel 21.

The hook portion 44 is a portion which serves as a pivot on which the pull pocket member 4 is swung when it is mounted to the lining 3, and is hooked over the peripheral edge defining the mounting hole 31 of the lining 3 and engages in the engaging hole 32 provided near the peripheral edge of the mounting hole 31. The hook portion 44 is disposed near an opening of the recessed portion 41 at the sidewall of the recessed portion 41 which makes up the underside of the overhanging portion of the undercut formed at the face 3a of the lining 3 when the pull pocket member 4 is mounted to the lining 3. For example, in the first embodiment, as shown in FIG. 3A, two hook portions 44 are provided protrusively and located separately from each other at a lower section 45a of the brim portion 45. Each hook portion 44 is designed to project in a direction substantially parallel to the sidewall of the recessed portion 41 such that the pull pocket member 4 can be swung with the hook portion 44 inserted in the engaging hole 32.

As shown in FIG. 3B, at a face of an upper section 45b of the brim portion 45 facing toward the outside of the vehicle are provided a pair of upper engaging portions 46 which are engageable with the lining 3. Each upper engaging portion 46 includes an engageable piece 46a shaped like a rectangular plate, a pair of ribs 46b provided to support and reinforce the engageable piece 46a, and a stopper projection 46c provided on top of the engageable piece 46a. The upper engaging portions 46 are fitted into engaging holes 33 (see FIG. 2) provided at the peripheral edge around the mounting hole 31 of the lining 3. At this time, the stopper projection 46c is snagged on the peripheral edge of the engaging hole 33, and thus the pull pocket member 4 is fixed to the lining 3.

At a face of either side section 45c of the brim portion 45 facing toward the outside of the vehicle are protrusively provided a pair of side engaging portions 47 which are engageable with the lining 3. Each side engaging portions 47, like upper engaging portion 46, includes a stopper projection provided at a tip thereof, so that the side engaging portion 47 is, once fitted in an engaging hole (not shown) provided in the lining 3, prevented from being easily extracted. With this configuration, the pull pocket member 4 is reliably fixed to the lining 3.

Subsequently, a method of manufacturing a vehicle door according to the first embodiment will be described with reference to FIGS. 4A and 4B. For the reference characters used herein, reference will be made to FIGS. 1 through 3B where appropriate. Illustrated in FIGS. 4A and 4B are sectional views for representing the method of manufacturing a vehicle door according to the first embodiment, in which FIG. 4A shows a state before its swinging motion, and FIG. 4B shows a state after the swinging motion.

Figure 4A:
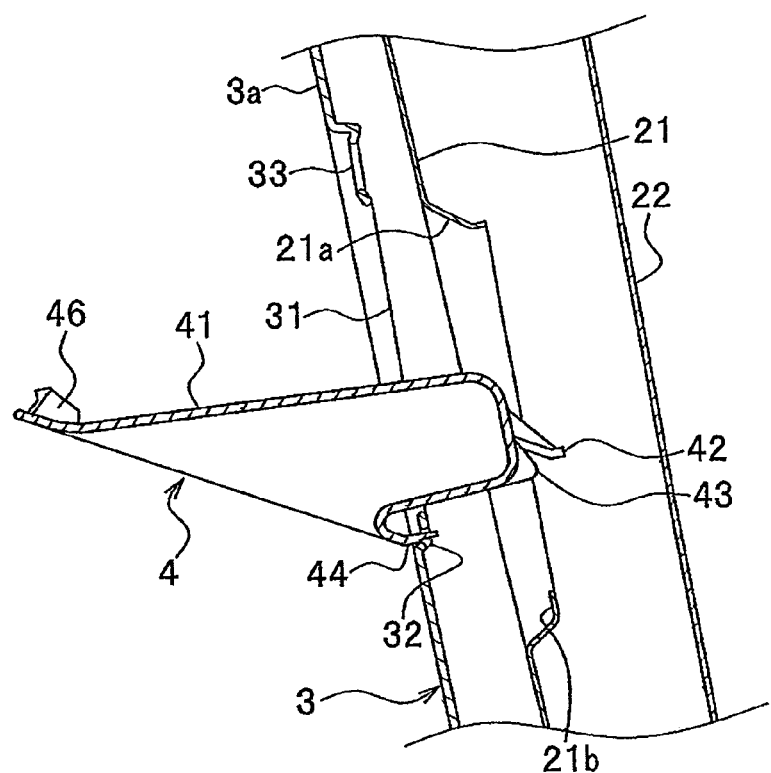
FIG. 4A is a sectional view showing a method of manufacturing a vehicle door according to the first embodiment, in which a state before swinging operation is illustrated.

First, as shown in FIG. 4A, a door inner panel 21 and a door outer panel 22 and a lining 3 are combined together.

Then, a pull pocket member 4 is oriented in such a position that the direction A (see FIG. 2) of the recessed portion 41 of the pull pocket member 4 is substantially perpendicular to the face 3a of the lining 3 facing toward the vehicle cabin, and the hook portion 44 of the pull pocket member 4 is inserted through the engaging hole 32 provided in the lower peripheral near the peripheral edge of the mounting hole 31. At this stage, the recessed portion 21a of the pull pocket member 4 is inserted through the mounting hole 31 of the lining 3 and the through hole 21a of the door inner panel 21, and the engaging portion 42 provided at the bottom of the recessed portion 41 is in a position outside relative to the door inner panel 21.

Figure 4B:
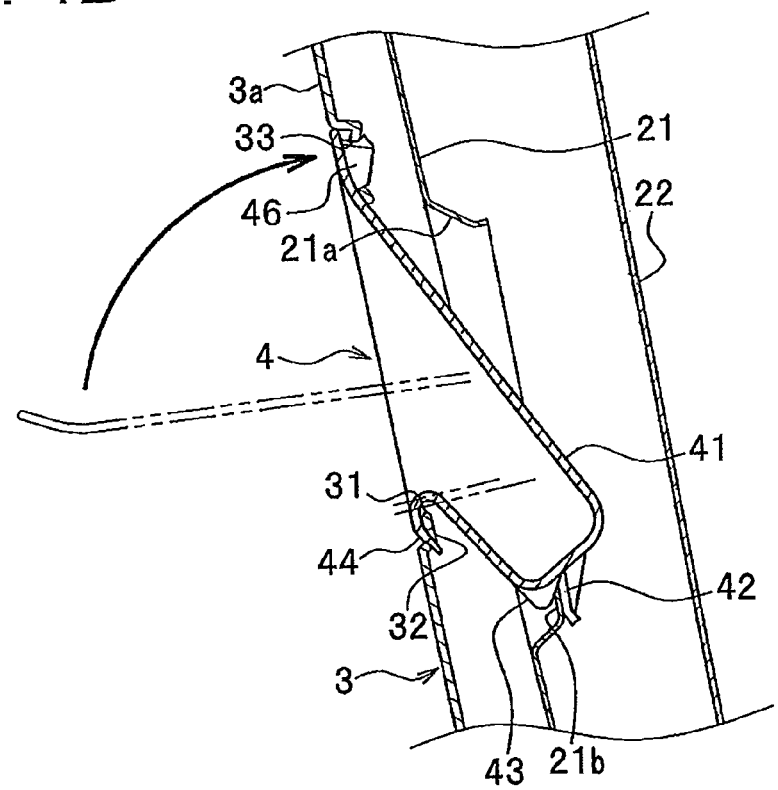
FIG. 4B is a sectional view showing the method of manufacturing a vehicle door according to the first embodiment, in which a state after swinging operation is illustrated.

Next, as shown in FIG. 4B, the pull pocket member 4 is swung on the hook portion 44 until the engaging portion 42 engages (contacts) with the peripheral edge 21b defining the through hole 21a of the door inner panel 21 from the closing direction B2 of the door (see FIG. 2). In this operation, the peripheral edge 21b goes past the top of the retaining portion 43 formed in a curved shape with the result that the peripheral edge 21b is pinched between the engaging portion 42 and the retaining portion 43. In this way, the pull pocket member 4 is mounted securely to the lining 3 and the door panel 2, so that the tailgate 1 provided with a pull pocket P is completed.

With the tailgate 1 according to the first embodiment, the following advantageous effects may be expected.

To be specific, since the pull pocket member 4 is formed independently of the lining 3, there is no need to consider that the recessed portion 41 should form an undercut at the face 3a (facing toward the vehicle cabin) of the lining 3, when the recessed portion 41 is formed in the pull pocket member 4. Therefore, the moldable design variation of the recessed portion 41 which makes up the pull pocket P can be increased. Moreover, since the pull pocket member 4 is formed independently of the lining 3, the pull pocket member 4 would never interfere with the formation of the lining 3. Accordingly, the formation of the lining 3 is facilitated, and the manufacture of the tailgate 1 is facilitated, as well. Furthermore, since the recessed portion 41 of the pull pocket member 4 is configured to form an undercut at the face 3a of the lining 3 facing toward the vehicle cabin when the pull pocket member 4 is mounted to the lining 3, a pull pocket P on which a hand can be put easily when the door is manipulated can be provided.

Moreover, since the direction A in which the recessed portion 41 is recessed is substantially perpendicular to the direction B of the swinging motion of the door, the manipulation force can be applied easily in the direction B of the swinging motion of the door, particularly in the closing direction B2. Therefore, a transmission efficiency of the manipulation force is increased so that manipulation force required to open or close the tailgate 1 can be reduced.

Furthermore, since the engaging portion 42 provided in the pull pocket member 4 is configured to engage with the door inner panel 21 when the pull pocket member 4 is mounted to the lining 3, the rigidity at a mounted position of the pull pocket member 4 may be enhanced. Since the engaging portion 42 is configured to engage with the door inner panel 21 from the closing direction B2 of the door, the manipulation force to be applied when the door is closed can be efficiently transmitted to the door inner panel 21.

In addition, since the lower peripheral edge 21b of the through hole 21a of the door inner panel 21 is pinched between the engaging portion 42 and the retaining portion 43 when the pull pocket member 4 is mounted to the lining 3, a backlash or rattle of the pull pocket member 4 can be prevented.

Furthermore, since the hook portion 44 for use in hooking the pull pocket member 4 over the engaging hole 32 provided near the peripheral edge of the mounting hole 31 of the lining 3 is provided at the lower edge 45a of the brim portion 45, the pull pocket member 4 may be swung on the hook portion 44 when the pull pocket member 4 is mounted. Accordingly, the pull pocket member 4 can be mounted to the lining 3 with increased ease.

With the method of manufacturing a tailgate 1 according to the first embodiment, the pull pocket member 4 can be mounted to the lining 3 and the door inner panel 21 in a simple operation which includes hooking of the hook portion 44 in the engaging hole 32 provided near the peripheral edge of the mounting hole 31 and subsequent swinging of the pull pocket member 4 on the hook portion 44. Therefore, the operating ease in manufacture of the tailgate 1 can be improved.

Next, a vehicle door according to a second embodiment of the present invention will be described with reference to FIG. 5. FIG. 5 is a perspective view of the vehicle door according to the second embodiment. A tailgate 1A according to the second embodiment is different from that of the first embodiment in that a recessed portion 41A making up a pull pocket P is recessed in an obliquely sideward direction with respect to the face 3a of the lining 3 facing toward the vehicle cabin.

The recessed portion 41A of the tailgate 1A is recessed toward the door panel 2 and to the left of the vehicle. In this way, the recessed portion 41A of the tailgate 1A forms an undercut at the face 3a of the lining 3 facing toward the vehicle cabin. Therefore, the pull pocket P thus formed is easy to put a hand on.

It is understood that the pull pocket member 4A of the tailgate 1A according to the second embodiment is equivalent to that which may result from 90-degree rotation followed by mounting to the lining 3 of the pull pocket member 4 of the first embodiment. In this way, the tailgate 1A according to the second embodiment has the lining 3 and the pull pocket member 4A formed independently of each other, and thus the direction of recess in the pull pocket P may be changed as desired. Furthermore, the direction of the pull pocket P may be determined without limitation, and thus the moldable design variation of the recessed portion 41A can also be increased.

Figure 6A:
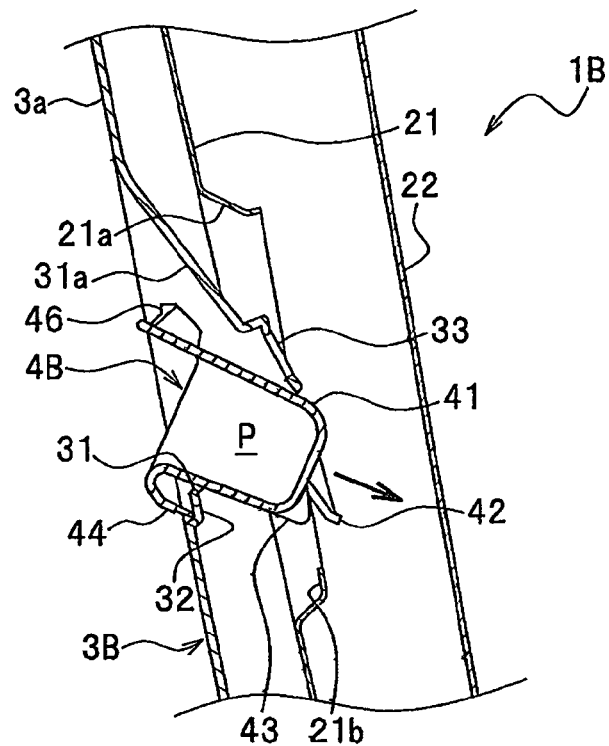
FIG. 6A is a sectional view of a vehicle door according to a third embodiment, in which a state before swinging operation is illustrated.
Figure 6B:
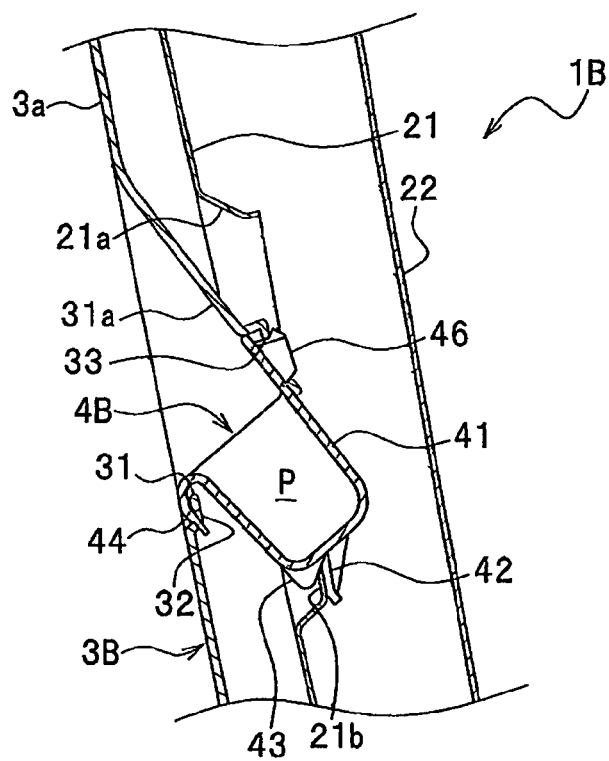
FIG. 6B is a sectional view of the vehicle door according to the third embodiment, in which a state after swinging operation is illustrated.

Next, a vehicle door according to a third embodiment of the present invention will be described with reference to FIGS. 6A and 6B. FIGS. 6A and 6B are sectional views of the vehicle door according to the third embodiment. A tailgate 1B according to the third embodiment is different from that of the first embodiment in that a pull pocket member 4B is shorter, and a non-undercut-side peripheral wall 31a of the mounting hole 31 of the lining 3 is longer.

Hereupon, the "non-undercut-side peripheral wall 31a" refers to part of peripheral walls of the mounting hole 31 opposite to the direction A in which the recessed portion 41 of the pull pocket member 4B is recessed.

In the third embodiment, the recessed portion 41 is formed in an obliquely downward direction, and thus the upper peripheral wall 31a at the non-undercut side is provided which extends in an obliquely downward direction. The upper peripheral wall 31a may be designed to extend to such a position that it does not reach a plane extending from the lower peripheral edge (i.e., the peripheral edge near which the engaging hole 32 is provided) of the mounting hole 31 in a direction perpendicular to the surface 3a of the lining 3 facing toward the vehicle cabin. With this configuration, in the process of injection molding of the lining 3, the mold or dies for the lining 3 can be separated in a direction perpendicular to the face 3a of the lining 3 facing toward the vehicle cabin. Consequently, part of the mold or a die can be separated or withdrawn with increased ease, which contributes to reduction of manufacturing cost of the lining 3, and thus of manufacturing cost of the tailgate 1B.

In the third embodiment, the upper peripheral wall 31a defining the mounting hole 31 is prolonged, and the pull pocket member 4B may be designed to be shorter. That is, the dimensions (shape) of the pull pocket member 4B may be changed in accordance with the length of the upper peripheral wall 31a. As a result, the moldable design variation of the pull pocket member 4B can be increased.

Next, vehicle door according to a fourth embodiment of the present invention will be described with reference to FIGS. 7A, 7B and 8. The same elements as in the above-described embodiments are designated by the same reference characters, and a duplicate description will be omitted.

Figure 7A:
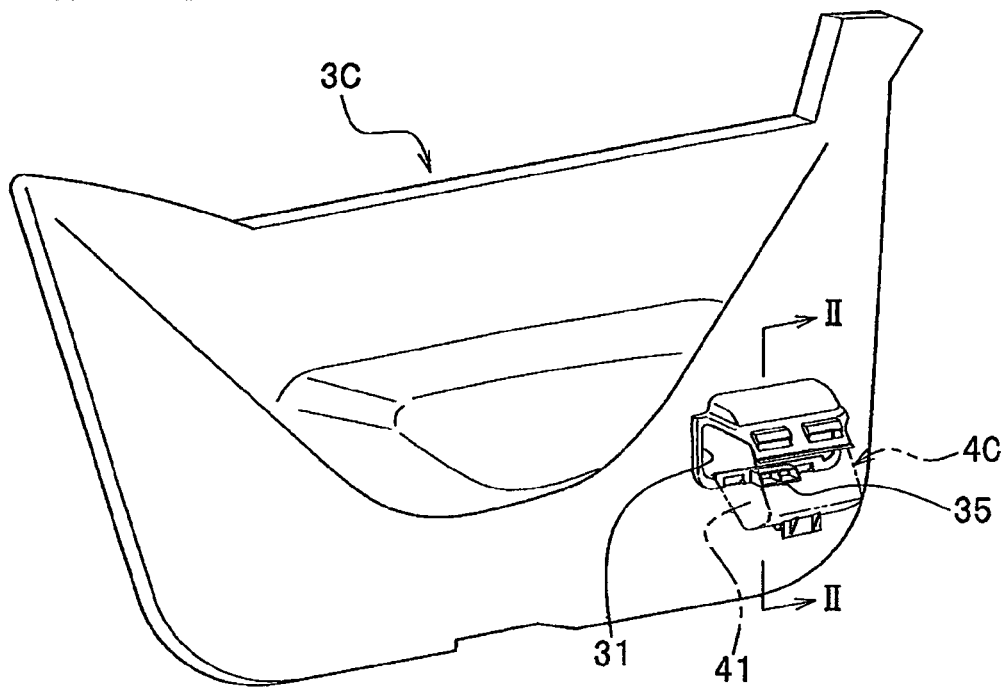
FIG. 7A is a perspective view of a lining of a vehicle door according to a fourth embodiment, as viewed in its entirety from an outside of the vehicle cabin.
Figure 7B:
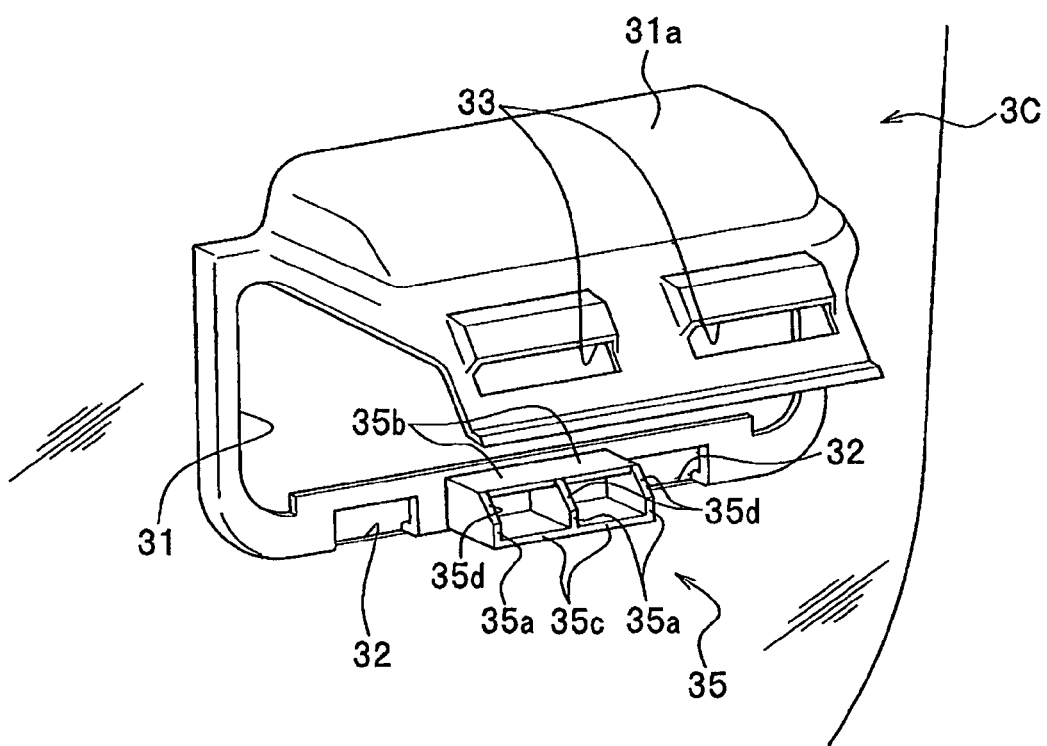
FIG. 7B is a magnified view of a portion of a lining of FIG. 7A near a mounting hole formed therein.

FIGS. 7A and 7B are perspective views of a lining of a vehicle door according to the fourth embodiment as viewed from an outside of the vehicle cabin, in which FIG. 7A illustrates the lining in its entirety, and FIG. 7B illustrates a portion of the lining of FIG. 7A near a mounting hole on an enlarged scale. FIG. 8 is a sectional view of the tailgate taken along line II-II of FIG. 7A. In FIG. 7A, a pull pocket member 4C is depicted in phantom lines (chain double-dashed lines). A tailgate 1C according to the fourth embodiment is different from that of the first embodiment mainly in that a spacer member 35 is provided between the recessed portion 41 of the pull pocket member 4C and the lining 3C.

As shown in FIGS. 7A and 7B, the lining 3C of the tailgate 1C (see FIG. 8) according to the fourth embodiment has a mounting hole 31 for use in mounting the pull pocket member 4C thereto.

An upper peripheral wall 31a of the mounting hole 31 is provided which extends toward the outside of the vehicle cabin. The peripheral wall 31a has a shape which turns down at a midpoint in section, and a pair of upper engaging holes 33, which are engageable with upper engaging portions 46 (see FIGS. 3B, 6A and 6B) respectively, are provided at its tip.

Near the lower peripheral edge of the mounting hole 31, a pair of engaging holes 32 in which a pair of hook portions 44 (see FIGS. 3A, 3B, 6A and 6B) of the pull pocket member 4C are engageable are disposed separately from each other. The spacer member 35 is provided at a midpoint position between the engaging holes 32 near the lower peripheral edge of the mounting hole 31. The "lower engaging holes" correspond to "engaging holes" recited in the appended claims.

The spacer member 35 is a member configured to prevent dislocation and/or deformation of the recessed portion 41. In the present embodiment, the spacer member 35 is protrusively provided at a surface of the lining 3C facing toward the outside of the vehicle cabin. The spacer member 35 may for example be formed together with the lining 3C in one piece by injection molding.

The spacer member 35 is comprised of three vertical walls 35a disposed separately from and parallel to each other, a top wall 35b connecting upper sides of adjacent vertical walls 35a, and a bottom wall 35c connecting lower sides of adjacent vertical walls 35a.

At upper outer portions of the vertical walls 35a, (at tip-end sides thereof) which are adjacent to sides facing toward the outside of the vehicle, contact portions 35d are formed which are configured to come in contact with the recessed member 4C. Each contact portion 35d has a sloped shape contoured to fit the sidewall 41a of the recessed portion 41.

Figure 8:
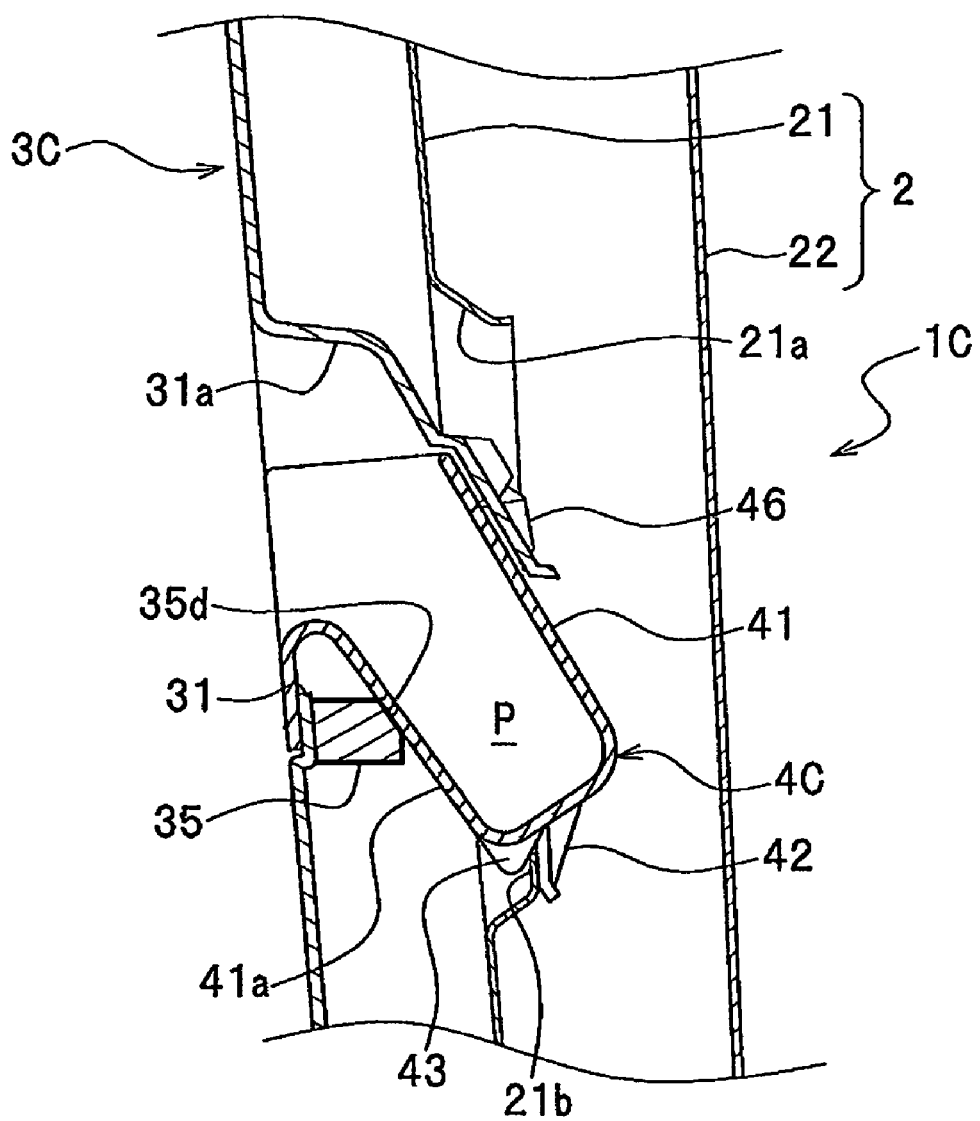
FIG. 8 is a sectional view of the vehicle door taken along line II-II of FIG. 7A.

As shown in FIG. 8, the contact portions 35d are brought into contact with the sidewall 41a of the recessed portion 41 when the pull pocket member 4C is mounted to the mounting hole 31 of the lining 3C. As a result, the spacer member 35 is disposed to extend between a back (side facing toward the outside of the vehicle cabin) of the lining 3C and the sidewall 41a of the recessed portion 41 which makes up the underside of the overhanging portion of the undercut formed at the face 3a of the lining 3C.

With this configuration, when a manipulation load is applied to the pull pocket member 41, the manipulation load is firmly supported and borne by the spacer member 35. Thus, the recessed portion 41 can be prevented from becoming dislocated or deformed. In addition, the strength at a mounted position of the pull pocket member 4C is enhanced, and thus the feel of firmness and robustness given when the door is manipulated is improved.

Furthermore, since the recessed portion 41 is brought into contact with the spacer member 35 when the pull pocket member 4C is swung and mounted to the lining 3C, the pull pocket member 4C is prevented from turning excessively. Therefore, the engaging portion 42 of the pull pocket member 4C can be reliably placed in engagement with the lower peripheral edge 21b of the through hole 21a.

Since the contact portions 35d of the spacer member 35 is contoured to fit the sidewall 41a of the recessed member 41, each contact portion 35d and the recessed portion 41 come in contact with each other without a gap left therebetween. Thus, the recessed portion 41 is retained thereon in a stable manner, so that a manipulation load applied to the pull pocket member 4C may be firmly supported and borne by the spacer member 35.

Furthermore, since the spacer member 35 is provided at a midpoint position between the pair of hook portions 44 and at a midpoint position between the pair of engaging holes 32 so as to extend between these midpoint positions, the most deflection-prone joint portion between the peripheral edge of the mounting hole 31 an the pull pocket member 4C can be adequately reinforced, and the feel of firmness and robustness is improved.

Although exemplary embodiments of the present invention have been described above with reference to the drawings, the present invention is not limited thereto; rather, various modifications and changes may be made to these embodiments without departing from the scope of the present invention as defined in the appended claims.

For example, the above embodiments have described the present invention as applied to a rear gate (tailgate) 1; however, the present invention is not limited thereto, but may be applied to the other vehicle doors such as a side door.

In the above embodiments, the recessed portion 41 is illustrated as being shaped like a quadrangular tube, but it goes without saying that other cross-sectional shapes may be applicable.

In the above embodiments, the hook portion 44 of the pull pocket member 4 is inserted into the engaging hole 32 provided near the lower peripheral edge of the mounting hole 21 of the lining 3; however, the present invention is not limited thereto, but the engaging hole 32 may be replaced by an engageable recess (not shown) which is recessed toward the door panel, so that the hook portion 44 may be hooked on the engageable recess.

In the above embodiments, the spacer member 35 is formed together with the lining 3C in one piece, but may be formed separately. The spacer member 35 may be provided in the pull pocket member 4C. The shape of the spacer member 35 is not limited to particular embodiments.

According to the embodiments of the present invention, various advantageous effects can be achieved. For example, there may be provided a vehicle door and a method of manufacturing the same, in which the door can be manipulated easily with a hand put thereon and the moldable design variation of the pull pocket can be increased.

The invention claimed is:

1. A vehicle door having a pull pocket on which a hand is put when the door is manipulated, the vehicle door comprising:
    a door panel comprising an outer door panel portion and an inner door panel portion attached to the outer door panel portion and having a hollow opening formed therein;
    a lining provided over an inside of the inner door panel portion and including a face facing toward a vehicle cabin when the door is mounted to a vehicle body;
    a pull pocket member formed independently of the lining and mounted to the lining, wherein the pull pocket member comprises a brim portion which is substantially flush with the face of the lining facing toward the vehicle cabin and a recessed portion which is integrally formed with the brim portion and recessed inside of the inner door panel portion and configured to form an undercut at the face of the lining facing toward the vehicle cabin when the pull pocket member is mounted to the lining; and
    a spacer member configured to extend between the recessed portion and the lining and disposed at a back of the lining in a position opposed to a sidewall of the recessed portion which makes up an underside of an overhanging portion of the undercut formed at the face of the lining facing toward the vehicle cabin when the pull pocket member is mounted to the lining,
    wherein the lining has a mounting hole in which the recessed portion is fitted when the pull pocket member is mounted to the lining,
    wherein the pull pocket member further comprises a pair of hook portions for use in hooking the pull pocket member over a peripheral edge of the mounting hole, the hook portions being disposed separately near an opening of the recessed portion at the sidewall of the recessed portion which makes up the underside of the overhanging portion of the undercut formed at the face of the lining facing toward the vehicle cabin when the pull pocket member is mounted to the lining,
    wherein the lining has a pair of engaging holes, in which the pair of hook portions are engagable, respectively, the engaging holes being disposed near the peripheral edge of the mounting hole, and
    wherein the spacer member is disposed at a midpoint position between the engaging holes of the lining.

2. The vehicle door according to claim 1, wherein the spacer member comprises a contact portion contoured to fit the sidewall of the recessed portion and configured to rest upon the sidewall of the recessed portion when the pull pocket member is mounted to the lining.

3. The vehicle door according to claim 1, wherein the lining has a mounting hole in which the recessed portion is fitted when the pull pocket member is mounted to the lining, and
    wherein the spacer member is mounted on the back of the lining at a peripheral edge of the mounting hole.

4. A method of manufacturing a vehicle door having a pull pocket on which a hand is put when the door is manipulated, comprising the steps of:
    providing a door panel with a lining over an inside of the door panel which faces toward a vehicle cabin when the door is mounted to a vehicle body, the lining having a mounting hole;
    providing a pull pocket member comprising a recessed portion and a hook portion, the recessed portion being configured to form an undercut at a face of the lining which faces toward the vehicle cabin when the recessed portion of the pull pocket member is fitted in the mounting hole of the lining to mount the pull pocket member to the lining, the hook portion being disposed near an opening of the recessed portion at a sidewall of the recessed portion which makes up an underside of an overhanging portion of the undercut formed at the face of the lining facing toward the vehicle cabin when the pull pocket member is mounted to the lining;
    fitting the recessed portion of the pull pocket member into the mounting hole of the lining until the hook portion of the pull pocket member is hooked over a peripheral edge of the mounting hole of the lining; and
    swinging the pull pocket member on the hook portion with the hook portion hooked over the peripheral edge of the mounting hole of the lining until the recessed portion of the pull pocket member engages with the door panel,
    wherein the providing the door panel comprises providing a spacer member at a back of the lining in a position opposed to the sidewall of the recessed portion which makes up the underside of the overhanging portion of the undercut formed at the face of the lining facing toward the vehicle cabin when the pull pocket member is mounted to the lining, such that the sidewall of the recessed portion is supported by the spacer member from a direction of a swinging motion of the door when the recessed portion engages with the body panel.

* * * * *